United States Patent
Strong

(10) Patent No.: US 7,159,695 B2
(45) Date of Patent: Jan. 9, 2007

(54) DAMPENING FOR A DOLLY WHEEL WITHIN A STEERING SYSTEM

(75) Inventor: Russell W. Strong, 410 S. Pitkin Rd., Craftsbury Common, VT (US) 05827

(73) Assignee: Russell W. Strong, Craftsbury Common, VT (US)

( * ) Notice: Subject to any disclaimer, the term of this patent is extended or adjusted under 35 U.S.C. 154(b) by 0 days.

(21) Appl. No.: 10/156,466

(22) Filed: May 28, 2002

(65) Prior Publication Data

US 2002/0174515 A1 Nov. 28, 2002

Related U.S. Application Data

(60) Provisional application No. 60/317,008, filed on Sep. 4, 2001, provisional application No. 60/293,873, filed on May 25, 2001, provisional application No. 60/293,848, filed on May 25, 2001.

(51) Int. Cl.
*B60B 33/00* (2006.01)
(52) U.S. Cl. ..................... 188/1.12; 16/35 D
(58) Field of Classification Search ............... 186/1.12, 186/19; 16/35 R, 35 D
See application file for complete search history.

(56) References Cited

U.S. PATENT DOCUMENTS

| 2,367,993 | A | * | 1/1945 | Bishop et al. ............... 16/35 D |
| 2,770,832 | A | | 11/1956 | Martin |
| 3,479,049 | A | | 11/1969 | Duecy |
| 3,518,714 | A | | 7/1970 | Hager |
| 3,672,701 | A | | 6/1972 | Blank |
| 3,817,548 | A | | 6/1974 | De Puydt et al. |
| 3,924,292 | A | | 12/1975 | Christensen |
| 4,078,821 | A | | 3/1978 | Kitterman |
| 4,178,007 | A | * | 12/1979 | Martineau .................. 16/35 D |
| 4,248,445 | A | | 2/1981 | Vassar |
| 4,353,567 | A | | 10/1982 | Weldy |
| 4,372,569 | A | | 2/1983 | Otterson |
| 4,432,116 | A | * | 2/1984 | Schultz ..................... 16/35 D |
| 4,449,725 | A | | 5/1984 | Robison et al. |
| 4,511,155 | A | | 4/1985 | Galloway |
| 4,645,230 | A | | 2/1987 | Hammons |
| 4,667,365 | A | * | 5/1987 | Martinek .................. 16/35 D |
| 4,685,174 | A | | 8/1987 | Hager |
| 4,821,833 | A | | 4/1989 | Yamaguchi |
| 4,834,412 | A | | 5/1989 | Trema |
| 5,066,030 | A | | 11/1991 | Brett et al. |
| 5,184,373 | A | | 2/1993 | Lange |
| 5,228,522 | A | | 7/1993 | Stufflebeam et al. |
| 5,590,605 | A | | 1/1997 | Salter et al. |

(Continued)

*Primary Examiner*—Robert A. Siconolfi
(74) *Attorney, Agent, or Firm*—John S. Artz; Artz & Artz, PC

(57) ABSTRACT

A dolly wheel assembly for a vehicle includes a dolly wheel and a dolly wheel spindle fixedly secured to the dolly wheel such that the dolly wheel and the dolly wheel spindle rotate together as a single unit. The dolly wheel spindle is in communication with a dampening device so as to apply a resisting force to the dolly wheel spindle. Application of the resisting or braking force restricts or prevents free rotation of the dolly wheel about an axis defined by the dolly wheel spindle. The dampening device is in communication with a controller which causes the dampening device to apply the resisting or braking force or to remove application of the resisting or braking force upon demand to satisfy a variety of different conditions encountered with the vehicle operation considering functional implication of the dolly wheel assembly.

12 Claims, 8 Drawing Sheets

U.S. PATENT DOCUMENTS

| | | |
|---|---|---|
| 5,607,030 A | 3/1997 | Swift et al. |
| 5,785,154 A | 7/1998 | Chen |
| 5,797,611 A | 8/1998 | Joseph et al. |
| 5,809,612 A * | 9/1998 | Finch ..................... 16/35 D |
| 6,050,008 A | 4/2000 | Doornek et al. |
| 6,070,701 A | 6/2000 | Hu |
| 6,094,846 A * | 8/2000 | Feller ..................... 16/35 D |
| 6,161,849 A * | 12/2000 | Schweninger ............ 16/35 R |
| 6,234,507 B1 | 5/2001 | Dickie et al. |

\* cited by examiner

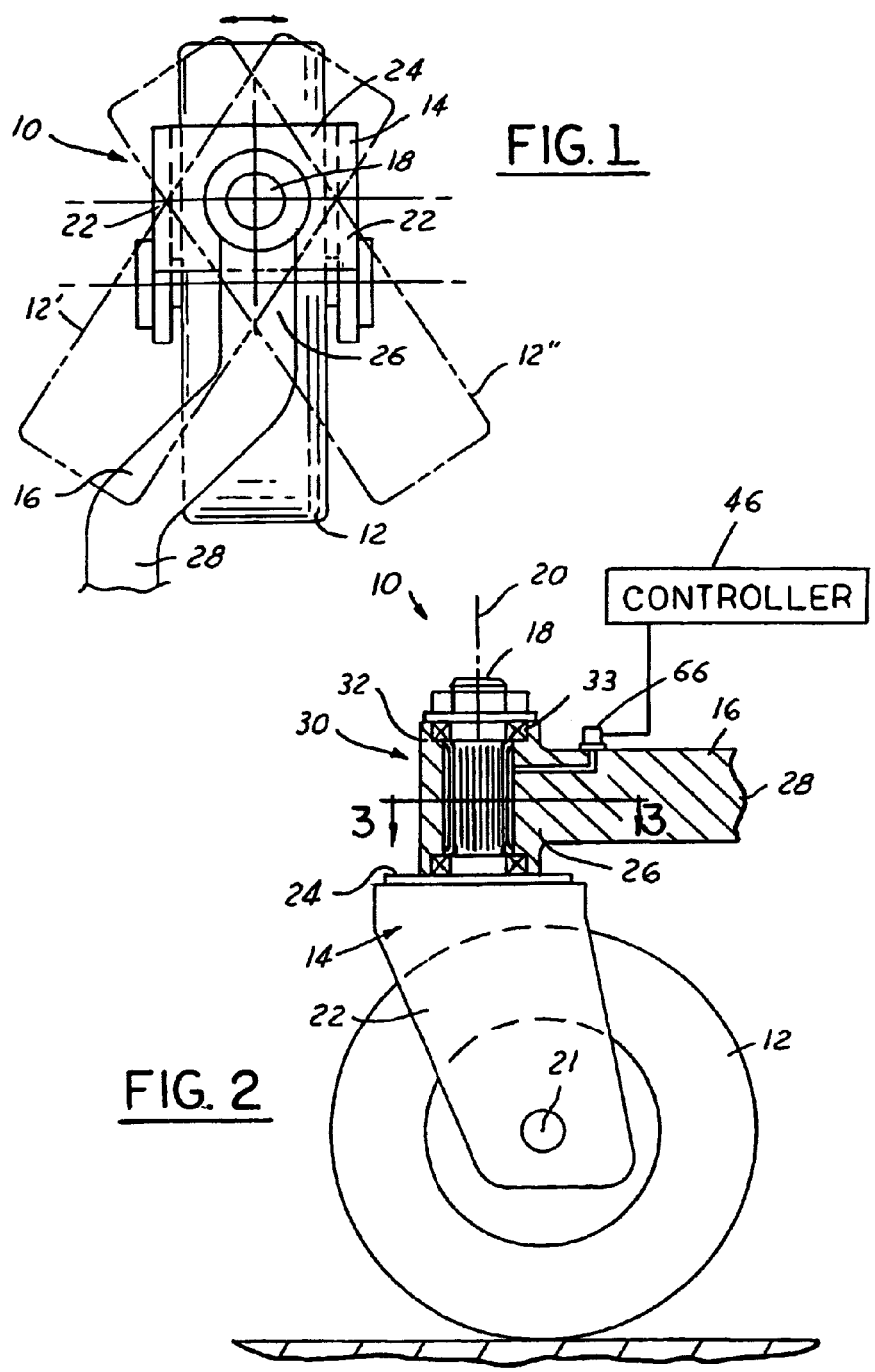

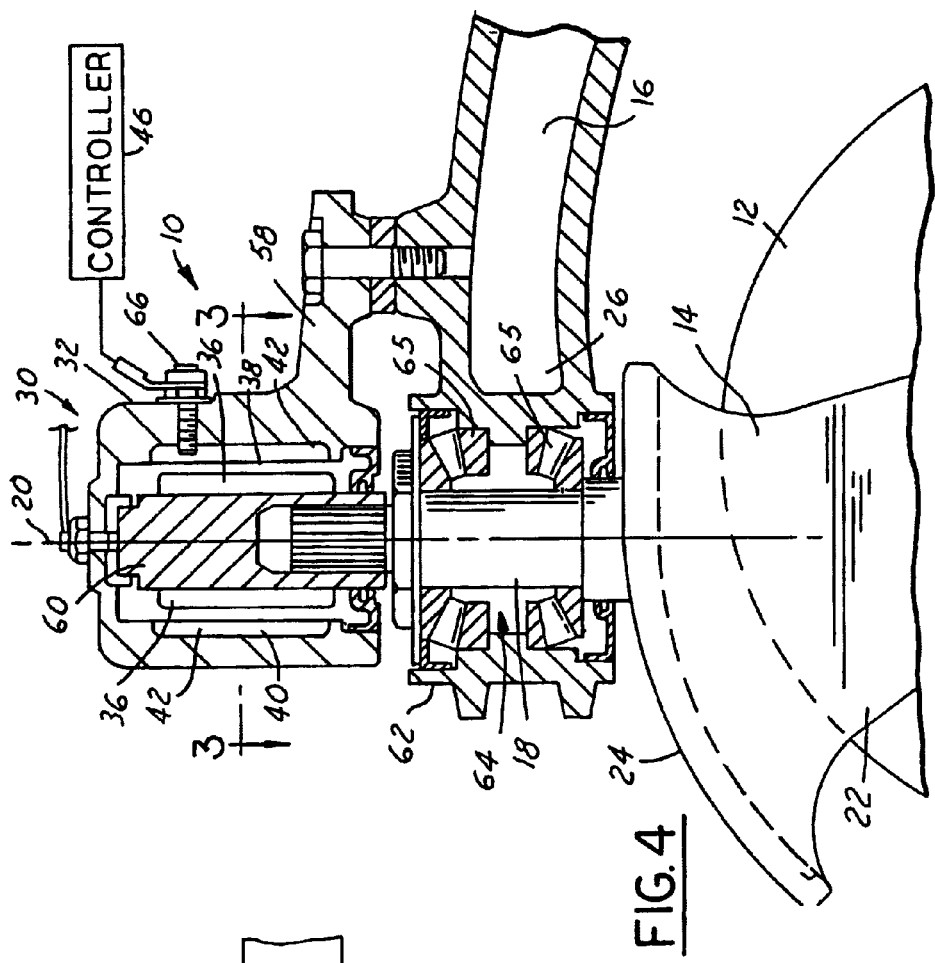
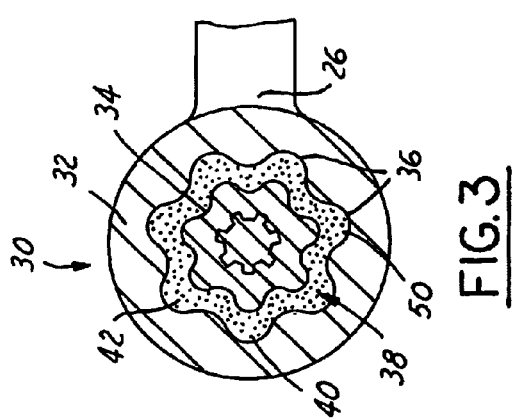
FIG. 4
FIG. 3

DAMPENING FOR A DOLLY WHEEL WITHIN A STEERING SYSTEM

CROSS-REFERENCE TO RELATED APPLICATIONS

The present invention claims priority from U.S. Provisional Application Ser. No. 60/293,873, entitled "Dolly Wheel Steering System Employing Speed Related Dampening," filed May 25, 2001; U.S. Provisional Application Ser. No. 60/293,848, entitled "Dual Mode Steering System For a Vehicle," filed May 25, 2001; and U.S. Provisional Application Ser. No. 60/317,008, entitled "Personal Mobility Vehicle," filed Sep. 4, 2001.

TECHNICAL FIELD

The present invention relates generally to dolly wheels for use with a vehicle to provide zero turn capabilities. More specifically, the present invention relates to dolly wheels that can operate in various terrain and at high speeds and thus can be utilized in a variety of all terrain and high speed applications.

BACKGROUND OF THE INVENTION

Dolly wheels are commonly used on vehicles or other devices which operate at low speeds (0–10 m.p.h.). However, when the speed of the vehicle increases, such as to 15 m.p.h. or greater, current dolly wheels can become unstable and oscillate or shimmy. The oscillation or shimmying is a phenomenon characterized by the vibration or rotation of the dolly wheel about its axis. The oscillation or shimmying is caused in part by offset load impacts on the wheels, such as can occur when the side of the dolly wheel surface that engages the road contacts resistance, stones or bumps, which cause the wheel to rotate and then recenter when the trailing dolly effect again becomes the controlling directional force on the wheel. In rapidly recentering, the wheel typically goes past center and then must recenter back again. The rapid effect that this phenomenon sets up is an ongoing shimmy or oscillation which is disruptive to the smooth operation of the vehicle.

As the speed of the vehicle increases, the need for rapid response of the dolly wheels and full rotation of the dolly wheels is lessened. At higher speeds, as discussed, however, road impacts to the dolly wheels can excite oscillation and instability of the dolly wheel axles. It would therefore be desirable to provide a dolly wheel system which resists the dynamic excitation caused by use of the dolly wheels at high speed.

As is known, with dolly wheel steering systems the front wheels follow the vehicle's motion direction as the vehicle rotation is normally provided by the drive axle. Dolly wheel in concert with drive axle steering utilizes free rotating dolly wheels that are configured to swivel 360 degrees with the trailing wheel center allowing for automatic alignment. In addition to instability at high speeds, this zero turn capability about the driven axis can cause instability when the free rotating dolly wheels encounter rough terrain which can result on loss of directional control. For example, because the dolly wheels respond to the unequal speeds of the drive wheels, undesired vehicle rotation and hence turning can result, such as when one drive wheel experiences slippage due to lack of traction or when the vehicle is driving along a side hill where the tires see unequal weight and thus unequal traction, or a side hill where the vehicle weight over the dolly wheel wants to pull that end downhill, whereas a steered tire would hold the desired vehicle path. At slower speeds and in normal conditions, however, the dolly wheels are required to have complete freedom to follow the drive wheel turn requirements.

It would therefore be desirable to have a dampening and/or locking system that can operate upon receipt of signals indicating the presence of conditions that are detrimental to dolly wheel stability or to undesired vehicle turning.

Presently, various methods and designs have been developed to reduce these problem of shimmying and oscillating. Some of these designs have used hydraulic braking devices and friction devices in order to restrain movement of the dolly wheels regardless of the speed of the vehicle. Moreover, some of these hydraulic dampers operate only at certain positions of the dolly wheels and others operate for the entire 360 degrees of rotation of the dolly wheel axle. They are thus constrained by when they can be deployed.

In one particular example, disclosed in U.S. Pat. No. 4,667,365, a system for providing a braking force for a dolly wheel is provided. The disclosed system provides a dolly wheel assembly including a support for attaching the dolly wheel to a vehicle, a dolly wheel mounting member rotatably mounted on the support, a rotating brake member mounted so as to rotate with the dolly wheel axle, and a stationary brake member fixed relative to the vehicle. The dolly wheel axle is defined by the dolly wheel kingpin and is free to rotate throughout the 360 degree path of travel of the dolly wheel. The assembly also includes a controller for operating the brake so as permit braking of the dolly wheel axle at any position.

In this case of U.S. Pat. No. 4,667,365, the programmable controller is intended to sense the speed of the vehicle. When the programmable controller senses that the speed of the vehicle is below a preset level, it does not apply any braking force to the axle and allows it to freely rotate. When the programmable controller senses that the speed of the vehicle exceeds a preset speed, the controller applies a predetermined force to the brake, which is sufficient to prevent oscillation or shimmying. While this system and other similar systems have been developed, they all present problems in controlling the actual dampening force as well as its repeatability in varying environmental conditions. Moreover, their lack of sensitivity causes them to be limited as to when they can be employed or used and thus they are not readily applicable to all vehicle designs.

SUMMARY OF THE INVENTION

It is therefore an object of the present invention to provide a dolly wheel dampening system that restricts the free rotation of the pivot axis under certain conditions.

It is another object of the present invention to provide a dolly wheel dampening system that provides varying dampening forces for varying restriction of the free rotation of the pivot axis.

It is a related object of the present invention to provide a dolly wheel dampening system that restricts the free rotation of the pivot axis in relation to speed of the vehicle employing the dolly wheel, and where limiting free rotation of the dolly wheel is advantageous to maintain directional control, through the use of a viscous fluid having characteristics of controllable varying viscosity.

It is another related object of the present invention to provide a dolly wheel dampening system that restricts free rotation of the pivot axis in relation to speed and where limiting free rotation of the dolly wheel is advantageous to maintain directional control, through the use of a hydraulic device having a variable flow restricting device.

It is a further related object of the present invention to provide a dolly wheel dampening system that restricts free rotation of the pivot axis in relation to speed and where limiting free rotation of the dolly wheel is advantageous to maintain directional control, through the use of an electric motor device having a circuit providing a variable resistance of rotation.

It is yet another related object of the present invention to provide a dolly wheel dampening system that restricts the free rotation of the pivot axis in relation to speed and where limiting free rotation of the dolly wheel is advantageous to maintain directional control, through the use of a mechanical détente.

It is yet another object of the present invention to provide a dolly wheel dampening and/or locking system that operates in communication with system requests for stability for parking, maneuvering on a hillside or tight locations, and operating in conditions of lessened steering control due to variable drive wheel slippage.

It is yet a further object of the present invention to provide a dolly wheel dampening system that can be incorporated into a mobility vehicle such as, but not limited to a personal mobility vehicle, a utility vehicle, or an automobile.

It is yet a further object of the present invention to provide a dolly wheel dampening system for a vehicle that reduces rotational oscillation and instability of the dolly wheel axles when the vehicle is operated at high speeds.

In accordance with the above and the other objects of the present invention, a dolly wheel system is provided. The dolly wheel assembly includes a dolly wheel, a dolly wheel spindle in communication with the dolly wheel such that the dolly wheel and the dolly wheel spindle are fixedly secured to one another and are rotatable as a single unit. The dolly wheel spindle is in communication with a dampening device. The dampening device applies a restraining force to the dolly wheel spindle upon command to prevent the dolly wheel from rotating. The dampening device is in communication with a sensing system of the vehicle and controls related thereto such that the dampening device may be actuated to apply the restricting force to the dolly wheel or remove application of the force upon demand to accommodate for a variety of different circumstances.

The dampening device is preferably comprised of an electroviscous fluid which has a controllable changing viscosity upon application of, and in relation to, varying electrical charge. The viscous fluid is located in a chamber that surround the dolly wheel spindle. Upon application of a current, the viscosity of the fluid increases and in concert with the shape of the chamber within which the spindle rotates as well as the shape of the rotating spindle within the chamber, effectively results in the application of a braking force to the dolly wheel spindle to dampen or prevent its rotation. Similarly, upon the removal of the current, the viscosity of the fluid decreases to remove the braking or dampening force, which allows the spindle to rotate.

The dampening device may also be comprised of an electric motor which has a resistance and braking force element that is electrically controllable responding in concert with the vehicle's sensing and controller signals. Similarly, upon removal of resisting forces, the motor allows essentially free rotation of the dolly wheel as desired for slow speed advantageous maneuverability.

The dampening device may also be comprised of a hydraulic pump/motor which can generate a resistance and braking force element controllable by a restrictive flow orifice corresponding in concert with the vehicle's sensing and controller signals. Similarly, upon removal of flow restriction to the pump/motor flow, the motor allows essentially free rotation of the dolly wheel as desired for advantageous slow speed maneuverability.

The dampening device may also be comprised of a détente device that upon receipt of a signal can provide varying stages of engagement to restrict and/or lock the dolly wheel pivot.

Other objects and features of the present invention will become apparent when viewed in light of the detailed description of the preferred embodiment when taken in conjunction with the attached drawings and appended claims.

BRIEF DESCRIPTION OF THE DRAWING

FIG. 1 is a top view of a dolly wheel dampening system in accordance with a preferred embodiment of the present invention;

FIG. 2 is a partial cross-sectional side view of a dolly wheel dampening system in accordance with a preferred embodiment of the present invention;

FIG. 3 is a cross-sectional view of the dampening device of FIGS. 2, 4, and 5 in the direction of the arrows 3—3;

FIG. 4 is a partial cross-sectional side view of a dolly wheel dampening system in accordance with another preferred embodiment of the present invention;

DETAILED DESCRIPTION OF THE PREFERRED EMBODIMENT

Figure 5:
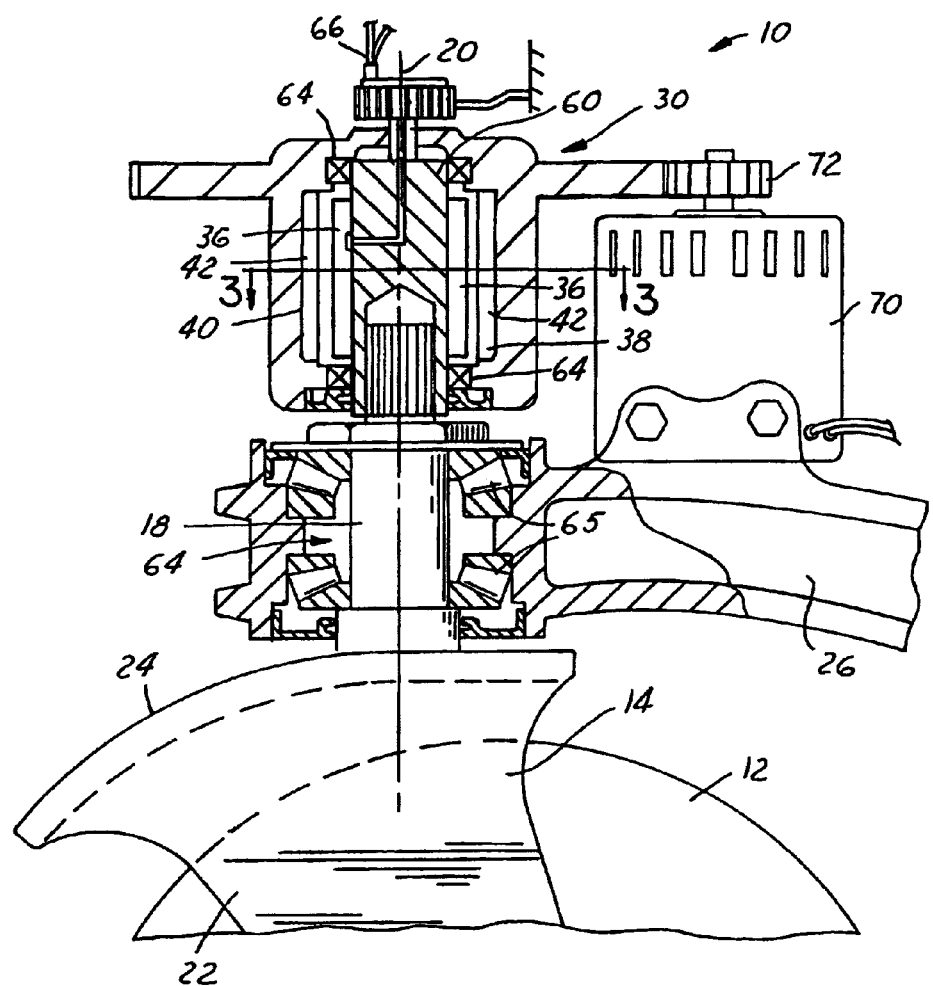
FIG. 5 is a partial cross-sectional side view of a dolly wheel dampening system in accordance with still another preferred embodiment of the present invention.

Referring now to FIGS. 1 and 2, which illustrate a dolly wheel assembly 10 in accordance with the present invention. The dolly wheel assembly 10 includes a dolly wheel 12, a dolly wheel mounting member 14, a support member 16 for the dolly wheel assembly 10, and a dolly wheel spindle 18. The dolly wheel 12 is preferably a free rotating wheel that is capable of rotating or swiveling 360 degrees with respect to an axis 20 defined by the dolly wheel spindle 18. The free rotating capability allows the dolly wheel to turn quickly. Moreover, the dolly wheel 12 can be turned to a variety of different positions, as shown generally by 12' and 12". In the preferred application, a pair of dolly wheel assemblies 10 are mounted to a front of a vehicle or other structure, as shown illustratively in FIG. 12. By utilizing dolly wheels for this application, this allows the vehicle to have zero turn steering capability.

As shown, the dolly wheel mounting member 14 includes a pair of downwardly extending flange portions 22 and may include an upper portion 24. The dolly wheel 12 is secured to the dolly wheel mounting member 14 by a shaft 21 that passes through each of the flange portions 22 and the center of the dolly wheel 12. The dolly wheel 12 is secured to the dolly wheel mounting member 14 by the shaft 21 such that the dolly wheel 12 can freely rotate radially in either a forward or rearward direction. While a pair of flange portions 22 are preferably utilized to secure the dolly wheel 12, it will be understood that only a single flange portion may also be utilized with the shaft 21 rigidly projected off of it to effectuate the axle. The mounting member 14 and the flange portions 22 can take on a variety of other configurations.

The dolly wheel spindle 18 is preferably secured to the upper portion 24 of the dolly wheel mounting member 14. Thus, as the dolly wheel 12 rotates with respect to the axis 20, the dolly wheel spindle 18 similarly rotates. The dolly wheel spindle 18 is rotationally secured through a bearing device 33 to the support member 16 at an outer end 26, such that the dolly wheel spindle 18 and the associated dolly wheel 12 can rotate in an axial direction with respect thereto. The support member 16 has an inner end 28 that is secured to a suspension system of a vehicle or other vehicle frame structure.

The dolly wheel spindle 18 while supported by the bearing device 33 is preferably in communication with a dampening device 30 to regulate the free rotation of the pivot axis. As will be understood from the discussion below, the dampening device 30 can work on demand through a controller to partially or fully dampen or clamp the dolly wheel spindle 18 for system stability as required by the system in response to a signal related to the vehicle speed or variabilities of traction or terrain. The controlled dampening can be achieved by a mechanical, hydraulic, electrohydraulic or electrically actuated détente system, a variable viscosity dampener, or a dampener device of hydraulic or electrical means that provides resistance of the dolly wheel spindle 18 to rotation about the axis 20. Various embodiments of the dolly wheel system 10 employing a dampening device are described in detail below with reference to the drawings.

FIGS. 2 and 3 illustrate one embodiment of the dampening device 30. As shown, the dolly wheel spindle 18 is located within a dampener housing 32. The outer surface 34 of the dolly wheel spindle 18 includes a plurality of radial ribs 36 formed thereon and which extend generally outwardly. While radial ribs 36 are preferably utilized, a variety of other protruding structures or surface contours may be utilized. A chamber 38 is defined between the outer surface 34 of the dolly wheel spindle 18 and an inner surface 40 of the dampening housing 32. The inner surface 40 of the dampening housing 32 also preferably has a plurality of radial grooves 42 formed therein. While radial grooves 42 are preferably utilized, a variety of other structures or surface contours may also be utilized. The dampening device 30 is in communication with a controller 46.

In accordance with the present invention, an electrically excited viscous fluid medium 50 is located within the chamber 38. The viscous fluid medium is known to those skilled in the art as magnetorheological (MR) fluid technology that when excited at times and in magnitude determined by the controller 46, by an electrical current, increases the effective viscosity of the fluid. However, it will be understood that other fluids of similar characteristics may be utilized. When current is applied to the chamber 38 through the contact 66, to excite the fluid medium 50 as regulated by the controller 46, such as from a current source located within the vehicle, the fluid medium 50 becomes more viscous up to and including a semi-solid state. The increased viscosity of the fluid medium 50, together with the radial ribs 36 and the radial grooves 42 cause resistant and slower pivot response of the dolly wheel 12 about the axis 20. Thus, the dampening device 30 restricts the dolly wheel 12 from rotating about the axis 20, thus reducing undesired oscillation or rotation.

The dampening device 30 is preferably on demand such that it can fully clamp or dampen the dolly wheel 12 as desired by an operator or as automatically controlled to respond to requirements for certain speed, traction, and terrain conditions. Each of the dolly wheels 12 of a vehicle can be clamped individually or collectively. For example, the vehicle can include an electronic speed sensor in communication with the drive system. When the sensor determines that the vehicle speed is rising above a certain level, a signal will be sent for electronic proportional actuation of the dampening device 30 to apply a restricting force to the rotation of the dolly wheel spindle 18. In the case of a differential traction of the drive wheels of the vehicle, or in response to a signal of side slope greater than a preset level, a full clamping force could be applied. In this case, the resisting force would only be released in response to a significant steering input during this condition of operation. Moreover, feedback control is preferably provided such that the amount of viscous dampening force being applied can also be sensed by an electronic sensor.

Some other examples of when the disclosed system can be utilized include for parking a vehicle on a hillside, maneuvering on a hillside, maneuvering in tight locations, or operating in conditions of lessened control or drive wheel slippage. Moreover, the dampening device 30 can be actuated directly. A principal benefit of the disclosed system is that the dampening device 30 can automatically and accurately engage in a desired relationship for vehicle travel stability. Additionally, another benefit is that the dampened steering at higher speeds reduces the likelihood of vehicle turning occurring at an unsafe rate. It will also be understood that the controller 46 could be designed to provide two or more modes of control with differing dolly wheel dampening relationships to accommodate an operator's desires related to vehicle use based on speed, terrain demands, style of driving, and traction conditions.

As shown in FIG. 4, in another embodiment where the dampening device 30 is secured to the dolly wheel support member 16. In this embodiment, the dampening device 30 is located in its dampening housing 32. The dampening housing 32 includes a support attachment arm 58, which is secured to the support member 16. The dampening housing 32 has a cylindrical post 60 disposed therein which is secured to the dolly wheel spindle 18. The dolly wheel spindle 18 is located in a spindle housing 62 and is secured to the upper portion 24. The dolly wheel spindle 18 is supported on a bearing assembly 64 including a pair of bearings 65 that allow it to rotate.

The dampening housing 32 has a chamber 38 located therein in which the viscous fluid medium 50 is located. The post 60 preferably has a plurality of radial ribs 36 formed thereon and the dampening housing 32 has an inner surface 40 having a plurality of radial grooves 42 formed therein. It will be understood that the dampening effect of the plurality of radial grooves 42 in concert with the plurality of radial ribs 36 and the varying viscosity fluid could be effectuated with similarly employed radial pins or other non-contact surface contours on the post 60 and the inner surface 40. The dampening housing 32 thus takes on the same configuration as the dampening device 30 shown in FIG. 3, except that the post 60 is located within the dampening housing 32. Moreover, the current to excite the viscous fluid medium 50 is preferably provided by a current contact 66, which is in electrical communication with the current source as determined by the controller 46. Thus, the dampening device 30 can be located external to the bearing assembly 64. It will also be understood that the dampening device can be assembled internally and integral with the bearing assembly 64 between the bearings.

FIG. 5 illustrates another embodiment of the present invention. In this embodiment, the dampening device 30 is used for the same purposes described above, namely to restrict movement of the dolly wheel 12 about its axis 20. However, the dampening device 30 in this embodiment can also be used in conjunction with a dual mode steering system. In the dual mode steering system, the dampening device is utilized in conjunction with a motor 70 when the controlled steering mode of the dolly wheel assembly is utilized. The dual mode steering system is described in detail in U.S. patent application Ser. No. 10/156,304, entitled "Dolly Wheel Steering System for a Vehicle," which is filed concurrently herewith and which is hereby incorporated by reference. However, in short, the motor 70, which can be either hydraulic, electric, or mechanical is secured to the support arm 26. The motor 70 is in communication with a pinion gear 72, which drives a gear 74, which is in communication with the cylindrical post 60.

Figure 6:
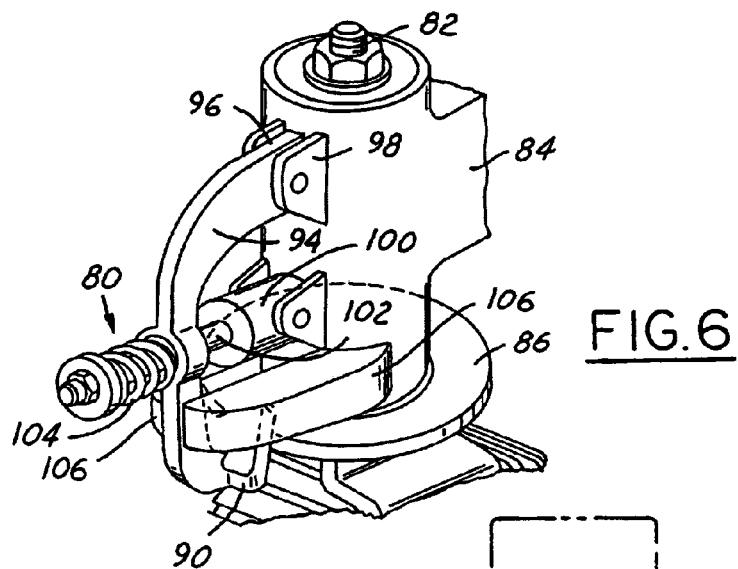
FIG. 6 is a perspective view of a dolly wheel dampening system in accordance with another preferred embodiment of the present invention.
Figure 7:
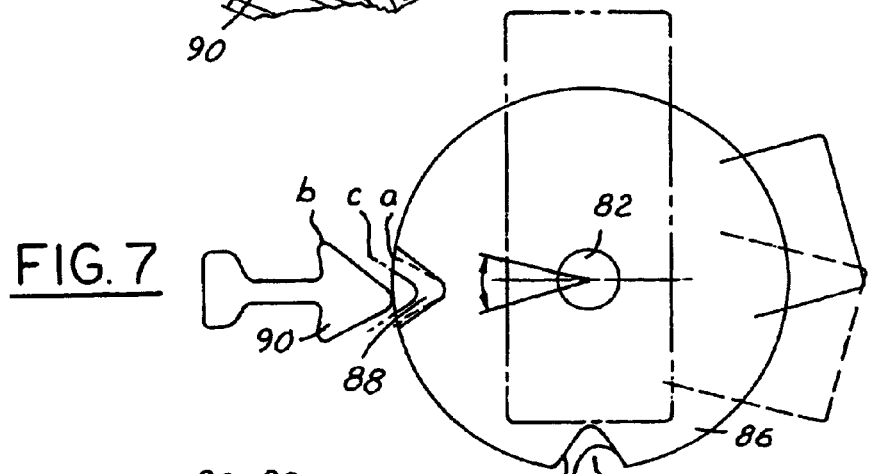
FIG. 7 is cross-sectional view of the dampening system of FIG. 6 in the direction of the arrows designated 7—7.
Figure 8:
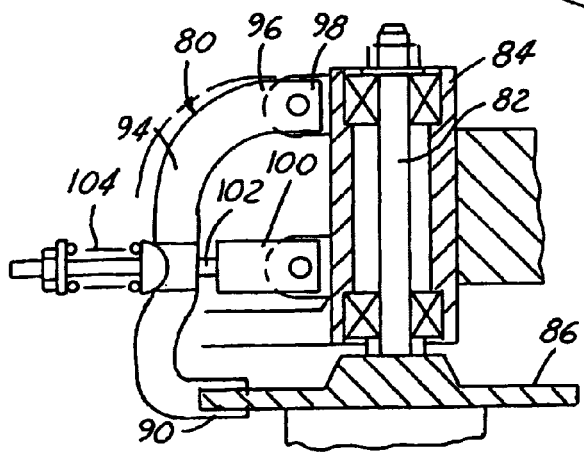
FIG. 8 is a cross-sectional view of the dampening system of FIG. 6 in the direction of the arrows designated 8—8.

FIGS. 6 through 8 illustrate an embodiment of a mechanical détente system for the dolly wheel assembly 12 in accordance with the present invention. The mechanical détente system 80 is preferably in communication with a dolly wheel spindle 82 to regulate free rotation of the pivot axis. As will be understood, the mechanical détente system 80 embodiment of the dampening device 30 can work on demand to partially or fully dampen or clamp the dolly wheel spindle 82 for system stability.

The mechanical détente system 80 includes a dampener housing 84 that houses the dolly wheel spindle 82 therewithin. The dolly wheel spindle 82 has a disc 86 fixedly secured to a bottom end 88 thereof such that the disc 86 rotates as the dolly wheel 12 and the dolly wheel spindle 82 rotate. The disc 86 has a notch 88 formed therein. The notch 88 is positioned such that it will receive a détente latch 90 therein when the dolly wheel 12 is oriented in a forward facing position. The notch 88 is generally "v" shaped with a pair of inwardly sloping surfaces 92 that help pull the détente latch 90 into secure engagement with the disc 86 to prevent rotation of the dolly wheel 12.

The détente latch 90 is disposed at the end of a détente arm 94. The détente arm is rotatably secured at its upper end 96 to the dampener housing 84 at an upper pivot 98. The détente arm 94 is in communication with an actuator 100. The actuator 100 has a linearly reciprocating arm 102 that moves the détente arm 94 outwardly to disengage the détente latch 90 from the notch 88 and moves the détente arm 94 inwardly and into engagement with the notch 88. The sloping surfaces 88 assist in allowing the détente latch 90 to fully rest in the notch 88. The actuator 100 is in communication with the controller 46 to cause the arm 102 to reciprocate correspondingly with desired détente actuation relative to vehicle operation.

As shown in FIG. 7, the arm 102 can be moved between a position fully locking the dolly wheel 12, as generally represented by letter a. In this position, the détente latch 90 is in full engagement with the notch 88. The arm 102 can also be moved to a fully retracted position, as generally represented by letter b. In this position, the détente arm 94 is pivoted about the upper pivot 98 such that the dolly wheel 12 has unrestricted movement. The arm 102 can further move the détente latch 90 to one or more intermediary positions, as generally represented by letter c. In this position, the détente arm 94 is only partially engaged with the notch 88. This allows limited swivel of the disc 86 and the dolly wheel 12 for corrective steering at speed. The détente arm 94 is in communication with a spring 104. The spring 104 is an override spring, which can allow override of the actuator 100 to cause the détente latch 90 to disengage the notch 88 as desired. For example, the spring 104 can allow override when there is a sudden demand for steering beyond that normal to corrective steering when at speed, such as for sudden obstacle avoidance. The housing 84 also preferably has a pair of guide flanges 106, which are intended to locate the détente latch 90 with respect to the notch 88.

Figure 9:
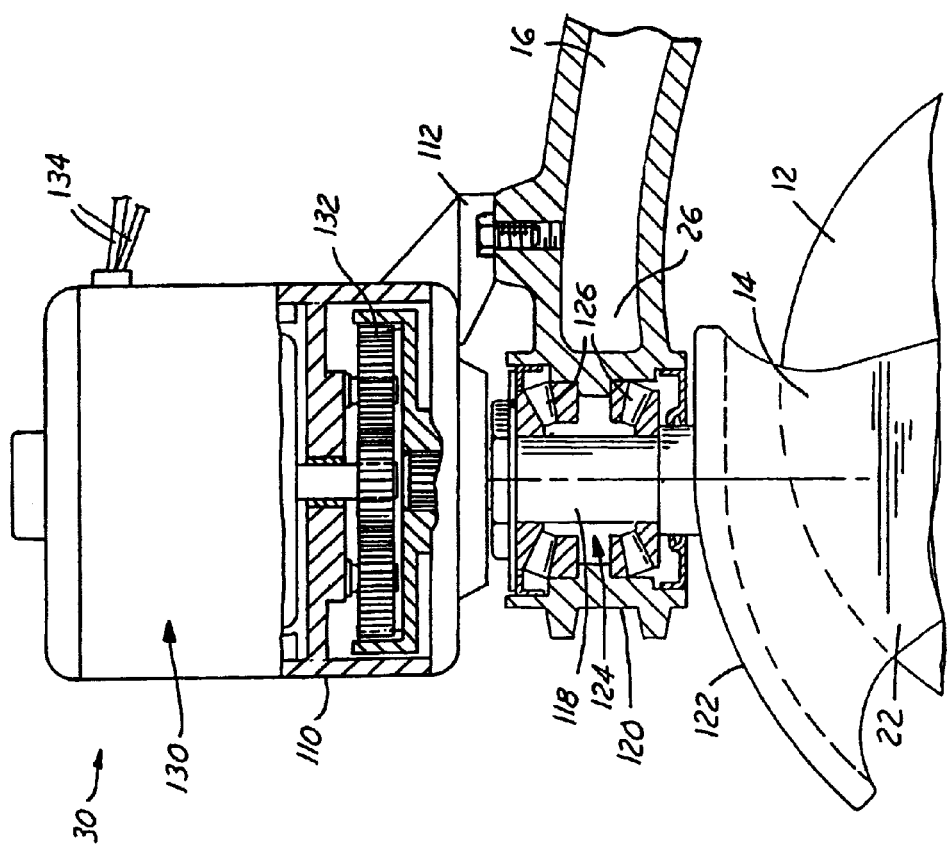
FIG. 9 is a partial cross-sectional view of a dolly wheel dampening system in accordance with still another preferred embodiment of the present invention.
Figure 10:
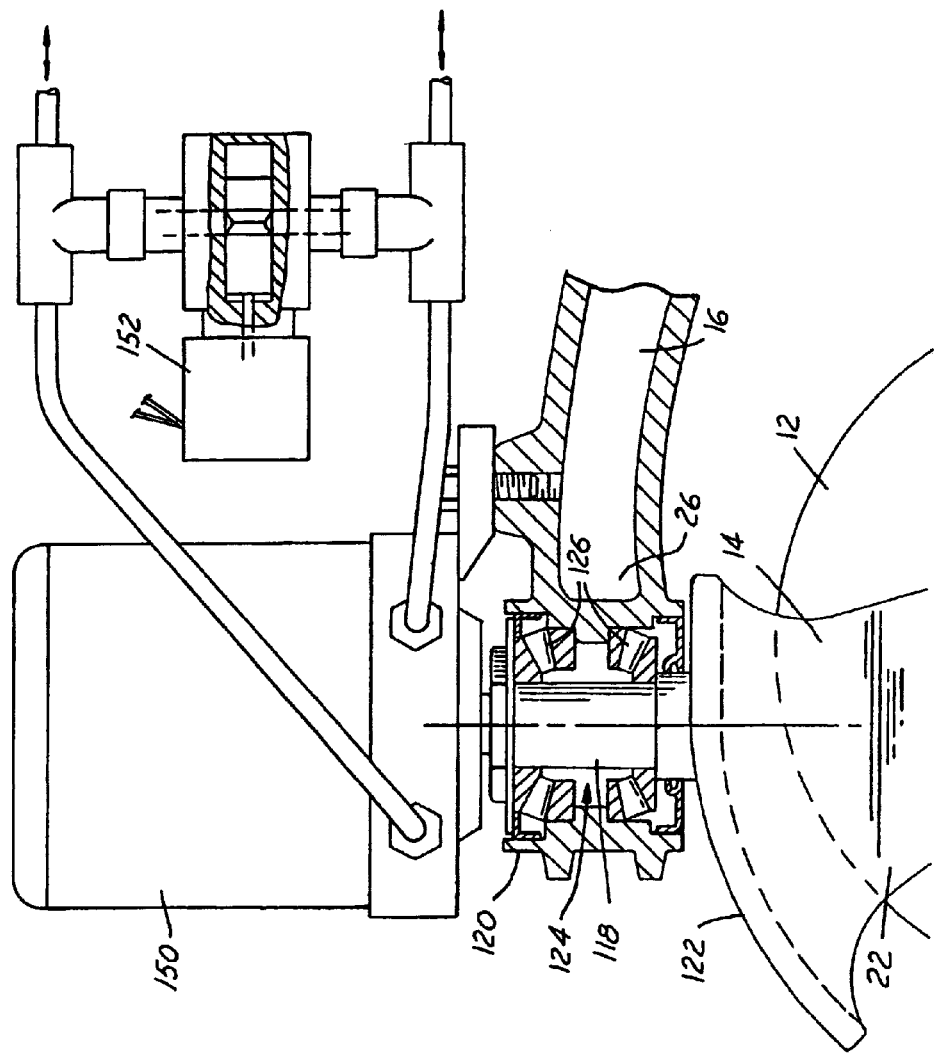
FIG. 10 is a partial cross-sectional view of a dolly wheel dampening system in accordance with yet another preferred embodiment of the present invention.
Figure 11:
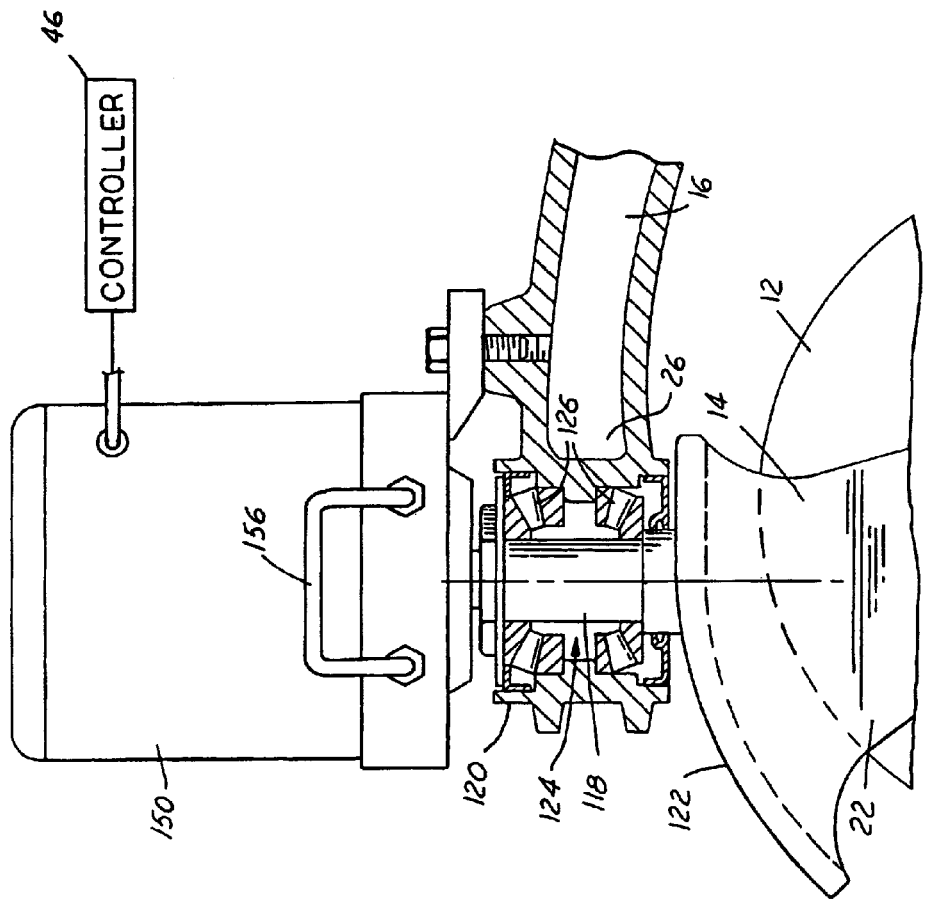
FIG. 11 is a partial cross-sectional view of a dolly wheel dampening system in accordance with still another preferred embodiment of the present invention.

Referring now to FIGS. 9, 10, and 11, which each illustrate alternate embodiments of a dampening device 30 in accordance with the present invention. In each embodiment, the dampening device 30, which differs in each embodiment as is discussed in more detail below, is located in a dampener housing 110. The dampener housing 110 includes a support attachment arm 112, which is secured to the support member 16. The dampener housing 110 is preferably disposed on top of a spindle housing 120. The spindle housing 120 has a dolly wheel spindle 118 located therein. The dolly wheel spindle 118 is secured to the upper portion 122 and is in communication with the dampener housing 110 at an upper end. The dolly wheel spindle 118 is supported on a bearing assembly 124 including a pair of bearings 126 that allow it to rotate.

In the embodiment shown in FIG. 9, the dampening device 30 is used for the same purposes described above, namely to restrict movement of the dolly wheel 12 about its axis 20 upon demand as regulated by the controller 46. The dampener housing 110 includes a support attachment arm 112, which is secured to the support member 16. The dampening device is preferably an electric motor 130 which is in communication with the dolly wheel spindle 118 through a planetary gear system 132 which is restrained by the housing 110. The electric motor 130 is preferably in communication with the controller 46 by wires 134. In an unexcited position, the dolly wheel spindle 118 can free wheel allowing full 360 degree rotation. In the excited position, the controller 46 signals the electric motor 130 to start applying a restrictive force to the dolly wheel spindle 118 through the planetary gear 134. It will be understood that the electric motor 130 can be powered to provide a braking force to the dolly wheel spindle 118 and thus the dolly wheel 12. The electric motor 130 can also be powered to provide rotation in a dampened manner of the dolly wheel spindle 118.

In the embodiment shown in FIG. 10, the dampening device 30 is used for the same purposes described above, namely to restrict movement of the dolly wheel 12 about its axis 20 as desired by the controller 46. The dampener housing 110 includes a support attachment arm 112, which is secured to the support member 16. The dampening device is preferably an pump/motor 150 which is in communication with the dolly wheel spindle 118 to apply a resistive or braking force thereto as regulated by the controller 24. The pump/motor 150 can be a vane pump, a piston pump, or a gear pump motor with appropriate controls to accommodate pump/motor characteristics. Obviously, other pump/motors can be utilized.

The pump/motor 150 is preferably in fluid communication with a valve 152 to control flow which allows or resists rotation of the dolly wheel spindle 118. The valve 152 is preferably electric controlled, but other valves may obviously be utilized. The valve 152 preferably has an open position, variable metered positions, and a closed position. When the valve 152 is in the open position, no force restricts the dolly wheel spindle 118 and the dolly wheel can thus rotate throughout its 360 degrees while pumping fluid freely through the open valve 152. When the valve 152 is closed, the total restriction of flow locks up the pump/motor 150 such that the dolly wheel spindle 118 is locked. When the valve 152 is partially restricted, a greater rotating force is required to pump fluid through the valve 152, thus providing a dampened effect on the rotation of the spindle 118.

As shown in FIG. 11, it is understood that an electroviscous fluid, such as a magnetorheological fluid, could be used in the pump/motor system in place of the variable flow control or orifice, such that rotational dampening and braking is effectuated by varying the viscosity of the electroviscous fluid. It is understood that this pump/motor 150 could be a vane pump, a gear pump, a piston pump, or other variation thereof. When the pump/motor 150 is in an unlocked state and the dolly wheel spindle 118 is free to rotate, the viscous fluid flows through a passageway 156. However, when the pump/motor 150 is in a locked state and the dolly wheel spindle 118 is prevented from rotating, no viscous fluid flows through the passageway 156 as the fluid is in a higher viscosity or semi-solid state.

Figure 12:
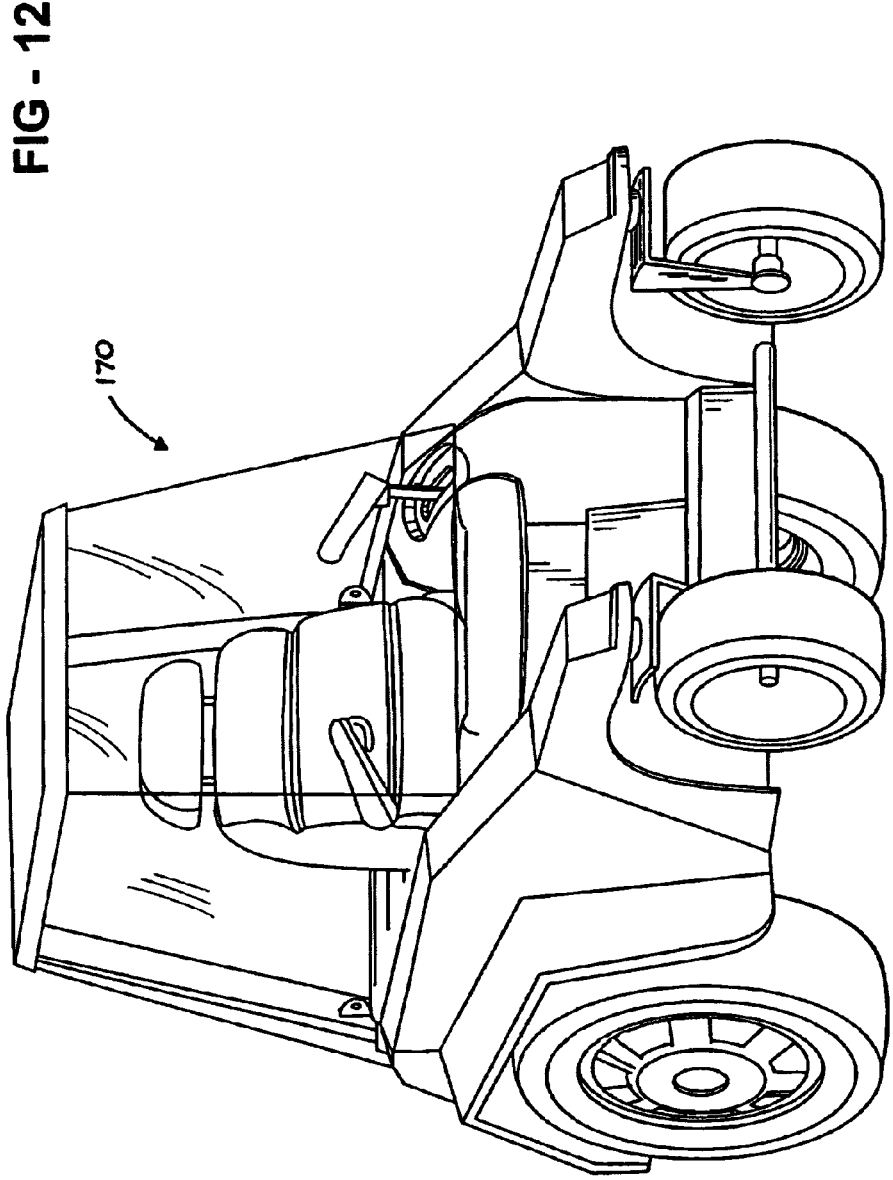
FIG. 12 is an illustration of a mobility vehicle utilizing a dolly wheel system in accordance with a preferred embodiment of the present invention.

The dampening system is preferably utilized in connection with dolly wheels, however it will be understood that it could be utilized for a variety of other applications. Moreover, the dampening system is preferably utilized on a pair of dolly wheels, which are incorporated into a vehicle. Preferably, the dolly wheels are utilized on a mobility vehicle 170, as shown in FIG. 12, but they could obviously be used on any type of driven or towed vehicle. Moreover, they can be located forwardly or rearwardly of the drive axle and less than or more than two dolly wheels may be utilized.

While a preferred embodiment of the present invention has been described so as to enable one skilled in the art to practice the present invention, it is to be understood that variations and modifications may be employed without departing from the purview and intent of the present invention, as defined in the following claims. Accordingly, the preceding description is intended to be exemplary and should not be used to limit the scope of the invention. The scope of the invention should be determined only by reference to the following claims.

The invention claimed is:

1. A dolly wheel assembly comprising:
   a dolly wheel;
   a dolly wheel spindle fixedly secured to said dolly wheel such that said dolly wheel and said dolly wheel spindle rotate about an axis as a single unit;
   a dampening device in communication with said dolly wheel spindle to apply a resisting force to said dolly wheel spindle to resist free rotation of said dolly wheel; and
   a controller in communication with said dampening device such that said dampening device can apply said resisting force or remove said resisting force upon demand to satisfy a variety of different conditions encountered by a vehicle employing the dolly wheel assembly;
   wherein said dampening device includes a electroviscous fluid located in a chamber that communicates with at least a portion of said dolly wheel spindle, such that upon application of a varying current, the viscosity of said electroviscous fluid varies.

2. The assembly of claim 1, wherein said electroviscous fluid has a low viscosity when excited by current to allow said dolly wheel to have a high degree of maneuverability.

3. The assembly of claim 1, wherein application of said current is controlled by said controller.

4. A dolly wheel assembly for a vehicle comprising:
   a dolly wheel rotatably secured to the vehicle and having an axis of rotation;
   a dolly wheel spindle fixedly secured to said dolly wheel;
   a dampener device in communication with said dolly wheel spindle to apply a restricting force thereto and prevent free rotation of said dolly wheel spindle; and
   a controller in communication with said dampener device to regulate application of said restricting force and the magnitude of said restricting force to be applied to said dolly wheel spindle depending upon dolly wheel requirements;
   wherein said dampener device is an electroviscous dampener including electroviscous fluid which is in communication with said controller, said electroviscous fluid having a normal low viscosity to allow said dolly wheel to freely rotate about said dolly wheel axis.

5. The dolly wheel assembly of claim 4, wherein said dampener device is in communication with a current source and upon application of said current, said electroviscous fluid increases in viscosity up to and including a semi-solid state.

6. The dolly wheel assembly of claim 5, wherein said electroviscous fluid has a viscosity between said normal low viscosity and said semi-solid state, resulting in said restricting force being applied to said dolly wheel spindle to limit movement of said dolly wheel except for corrective steering.

7. The dolly wheel assembly of claim 6, wherein said controller is in communication with sensors and in concert with said electroviscous fluid can provide low viscosity for dolly wheel response to corrective steering and higher dampening viscosity after corrective steering action.

8. The dolly wheel assembly of claim 4, wherein said electroviscous fluid is located in a dolly wheel spindle housing.

9. The dolly wheel assembly of claim 4, wherein said electroviscous fluid is located in a separate dampener housing which is separate from, but in communication with, said dolly wheel spindle.

10. The dolly wheel assembly of claim 4, wherein said electroviscous dampener has a dampener housing having a plurality of surface contours formed on an inner peripheral surface thereof to communicate with said electroviscous fluid.

11. The dolly wheel assembly of claim 10, wherein said plurality of surface contours are radial ribs.

12. A method of restricting movement of a dolly wheel assembly, comprising:
   securing a dolly wheel spindle to a dolly wheel such that said dolly wheel and said dolly wheel spindle rotate about an axis as a single unit;

applying a restricting force to said dolly wheel spindle on demand to limit rotation of said dolly wheel about said axis to accommodate a variety of different conditions encountered by a vehicle employing the dolly wheel assembly; and removing said restricting force from said dolly wheel spindle on demand to allow said dolly wheel to rotate freely about said axis;

wherein said restrictive force is applied by an electroviscous dampening device having an electroviscous fluid, and being in communication with said dolly wheel spindle, the viscosity of said electroviscous fluid increases upon application of a current.

* * * * *